United States Patent Office 2,856,795
Patented Oct. 21, 1958

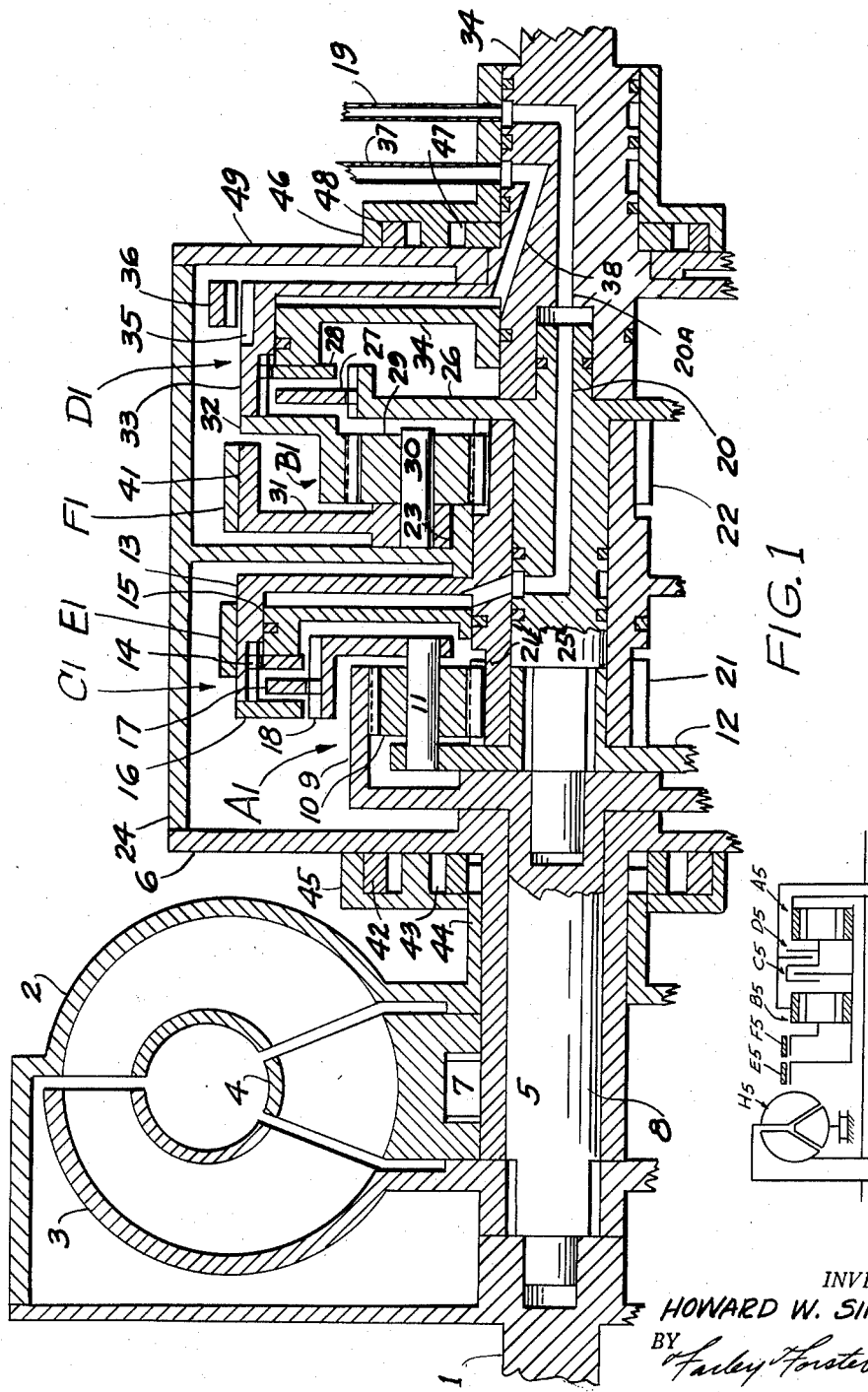

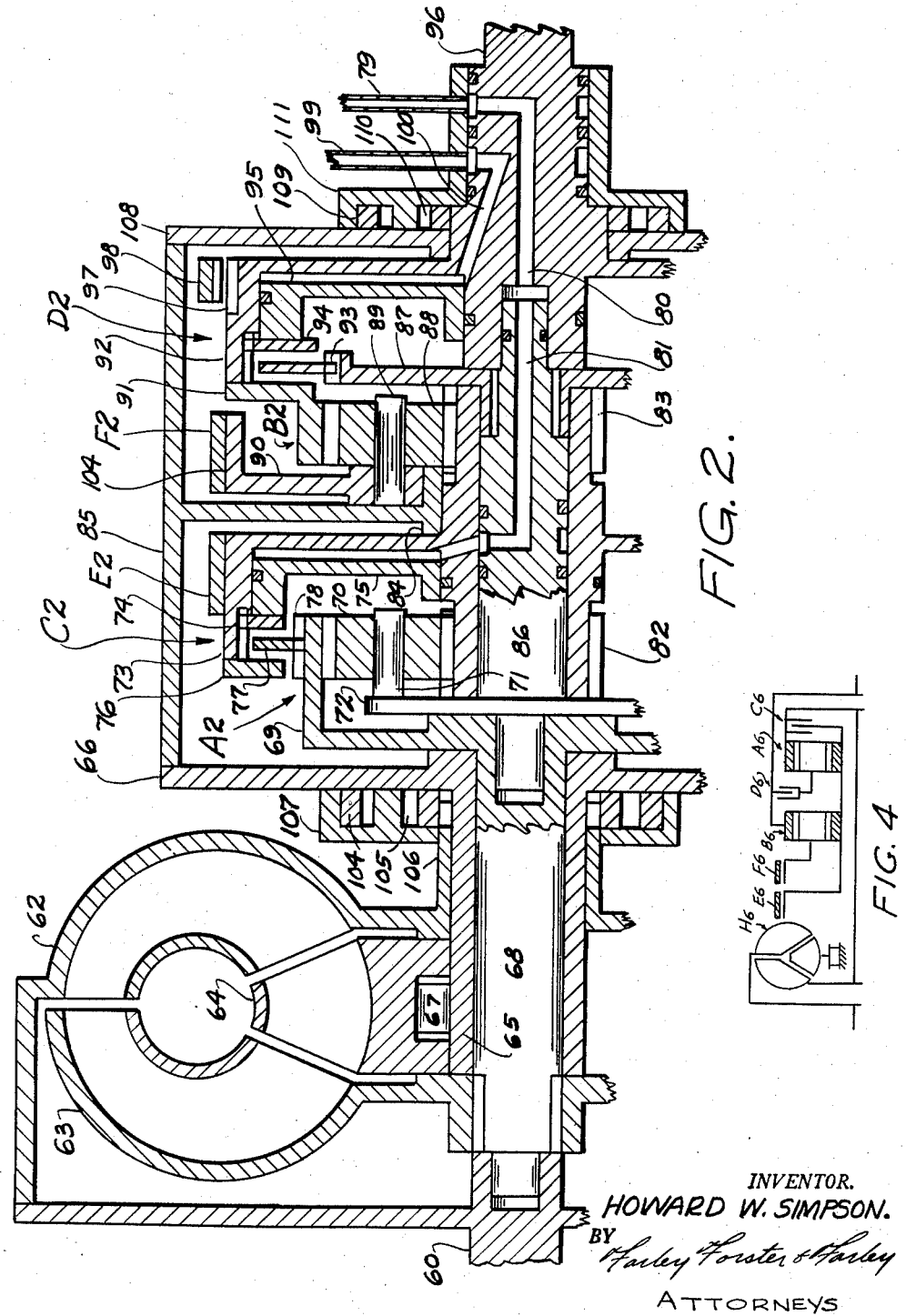

2,856,795

PLANETARY TRANSMISSION FOR SELF-PROPELLED VEHICLE

Howard W. Simpson, Dearborn, Mich.

Original application November 21, 1951, Serial No. 257,549. Divided and this application June 11, 1956, Serial No. 590,723

12 Claims. (Cl. 74—763)

This invention relates to an improved form of planetary gear variable ratio power transmission for automotive vehicles.

The present application constitutes a division directed to the non-elected species disclosed in Figs. 1, 2, 5 and 6 of my co-pending application, Serial No. 257,549.

The gear train described in this disclosure is similar to the portion of the gear train shown in my Patent 2,518,824 which is used to obtain three speeds forward, one reverse and neutral. In the above patent two toothed clutches and one friction clutch are used, making a total of three clutches, the friction clutch being necessary to obtain direct drive. In the present disclosure the two friction clutches in each of the several species shown are used in such a way that a third clutch is not necessary to obtain direct drive, the latter being obtained by engaging both friction clutches at once.

The gear train in this disclosure is also similar to that in my Patent 2,518,825 and overcomes certain disadvantages in the latter by re-arrangement, and relocation of the two friction clutches employed therein. In Patent 2,518,825 the gears tend to be noisy when idling in neutral because there is no floating member between the input and output shafts and the planet gears of the set of gears adjacent to the input shaft are subjected to the entire speed differential of these two shafts. In the present disclosure a floating member is inserted between the input and output shafts in each species shown which can rotate under the influence of frictional drag from either the gear teeth or the clutch plates or both, at a speed intermediate that of the input and output shafts. This floating structure slows the tooth engagement speed of idling gears to a speed proportional to the relative speed of the intermediate and the input shafts.

Also in my Patent 2,518,825 when in reverse drive the tooth engagement speed of the idling gears is high and this tends to produce objectionable noise. The re-arrangement and relocation of the clutches overcomes this objection by locking up the nonworking gears in reverse.

Also in my Patent 2,518,825, in neutral the high relative speed of the friction members of the clutch which connects the two sun gears is objectionable from the standpoint of noise and heat. This is avoided in the present disclosure by having a floating member between the input and output shafts which permits the sun gears to be integral. The clutch which was needed between the sun gears in the former disclosure is replaced in the present disclosure by one in which there is never a high differential speed between the friction members.

Also in my Patent 2,518,825, in reverse speed the relative speed of the friction members of the clutch which is not engaged is very high and could cause overheating of these clutch surfaces. This condition exists because the sun gear of the gear set adjacent to the input shaft is not locked to the sun gear which is then acting as reverse driving gear but is made to spin backward at high speed. This condition is avoided in the present embodiments by having a different location for the two clutches which permits having the sun gears integral so that the nondriving sun cannot spin backwards. High relative speed of the friction members of that relocated clutch which is disengaged in reverse is avoided by placing it where the members connected thereby have a low speed differential.

In the present application I have disclosed gearing consisting of two simple planetary sets of the internal-external gear type which in combination provide three forward speed ratios, one reverse ratio and a no drive or neutral. Two friction clutches are used to control the flow of power through the gear elements. Two brakes are also used which hold certain elements of the planetary gearing as reaction members as required in reduction speed ratios. The clutches and brakes are intended to be operated hydraulically although the hydraulic cylinders for operating the brakes are not shown. Also the hydraulic valves and associated parts for controlling both the brakes and the clutches are omitted as they do not form a part of this invention.

Alternative methods of using two friction clutches to couple the various gear elements are shown in the present disclosure and each method has certain advantages.

An object of this invention is to provide a simple and efficient combination of gearing and hydraulic torque converter.

Another object is to provide optional methods of coupling the specific gear train in this disclosure to obtain the same three forward and one reverse ratios in each case while avoiding objectional features of my earlier constructions.

Another object is to provide a method of connecting gear members by clutches whereby the relative speed of adjacent clutch friction elements and associated parts of both clutches is kept relatively low in all speeds and in neutral.

Another object is to provide a method of connecting gear members of a three speed and reverse planetary transmission by clutches so that the tooth engagement speed of idling gears is kept low in all speeds but especially in neutral and reverse in order to reduce friction and noise.

Another object is to provide a method of connecting gear members of a three speed and reverse planetary transmission so that the tooth engagement speed of the working gears in each speed is kept low to reduce friction and noise.

Another object is to provide method of connecting the gear members by two clutches to provide a floating member between the input and output shafts and to provide three speeds forward, one reverse and neutral without requiring more than these two clutches.

Another object is to provide a method of connecting gear members by means of clutches whereby oil under pressure passes into rotating clutch hydraulic cylinders in a simple manner through the minimum number of relatively rotative parts.

These and other objects will become apparent from the following description together with the accompanying drawings which are simplified partial elevations in section of several embodiments of my invention each employing two axially aligned planetary tests.

In Fig. 1, one clutch connects the planet carrier of the first set of gears to integral sun gears of both sets and a second clutch connects the planet carrier of the first set with the output shaft.

In Fig. 2, one clutch connects the input shaft to integral sun gears of both gear sets and a second clutch connects the planet carrier of the first set to the output shaft as in Fig. 1.

Figs. 3 and 4 are schematic diagrams showing the principal units of transmissions having an optional method of transposing the two gear sets shown respectively in Figs. 1 and 2.

Referring to Fig. 1, engine shaft 1 drives converter pump 2 which transmits torque to turbine 3. Stator 4 is a reaction member of the converter and is mounted for rotation on stationary hub 5 of housing flange 6 and is held against backward rotation by free wheel or one way clutch unit 7. Turbine 3 is splined to transmission input shaft 8 which is integral with ring gear 9 of gear set A1 and meshes with several planet gears 10, one of which is shown mounted on shafts 11 in planet carrier 12.

Clutch C1 consists of housing 13 containing sliding disc 14, piston 15 and has pressure plate 16 attached. Sliding disc 17 is splined to drum 18 which is fixed to carrier 12 through shafts 11. Oil pressure entering through tube 19 and passages 20 and 20A moves piston 15 to engage discs 14 and 17 against pressure plate 16 and thus connects carrier 12 to sun gears 21 and 22 which are integral with clutch housing 13. Clutch C1 is supported in hub 23 of housing 24.

Planet carrier 12 is splined to intermediate shaft 25 which has drum 26 to which sliding clutch disc 27 is splined.

Referring to gear set B1, sun gear 22 meshes with planet gears 29 mounted on shafts 30 which are fixed in planet carrier 31. Ring gear 32 also acts as a pressure plate for clutch D1 which consists of housing 33 and discs 27 and 28 and piston 34. Clutch housing 33 is integral with output shaft 34 and has teeth 35 cut in its periphery which can be engaged by a parking brake detent 36 attached to housing 24. Oil pressure through tube 37 and passage 38 moves piston 34 to engage clutch D1.

Brake band E1 acts on clutch housing 13 which also serves as a brake drum and brake band F1 acts on drum 41 which is integral with planet carrier 31. Both brake bands are selectively engageable to hold drum 41 and clutch housing 13 stationary.

Pump gears 42 and 43 are driven from the engine shaft 1 through pump 2, the hub 44 of which is notched to fit into mating notches in gear 43. Housing 45 encloses these gears. Output shaft pump gears 48 and 47 are enclosed in housing 46 and are driven by the output shaft by means of a key not shown. Housing flange 49 attached to housing 24 supports the output shaft 34.

*Operation 1*

In the embodiment of Fig. 1 in neutral all clutches and brakes are released. Intermediate shaft 25 floats between input and output shafts 8 and 34 and the frictional drag in gear set A1 causes shaft 25 to rotate at a speed which is slower than that of input shaft 8 when the vehicle is stationary. This causes sun gears 21 and 22 to rotate slowly and carrier 31 to rotate still more slowly.

In low speed clutch D1 and brake F1 engage and carrier 31 becomes a reaction member. This forces planets 21 and 22 backward and carrier 12 and ring gear 32 forward. This is a differential drive with the power transmitted partly through gear set A1 and partly through both sets A1 and B1.

In second speed clutch D1 remains engaged but brake F1 is released and brake E1 engaged and sun gear 21 becomes the reaction member while carrier 12 is driven forward.

In high speed both brakes are released and clutches C1 and D1 engaged which locks the gears together so they rotate as a solid unit with a one to one ratio between the input and output shafts obtained without the use of a third clutch, as required in the transmission of my Patent 2,518,824.

In reverse speed clutch C1 and brake band F1 are engaged. Noise from gear set A1 is avoided by its being locked to rotate as a unit with input shaft 8 by clutch C1. Reverse driving sun gear 22, being integral with sun 21, also rotates with the input shaft 8. Carrier 31 is the reaction member and ring gear 32 and output shaft 34 now rotate backward at reduced speed. The relative speed of clutch plates 27 and 28 is equal to the sum of the input and output speeds which is considerably less than that of corresponding clutch members in my Patents 2,518,824 and 2,518,825, when designed for the same speed ratios.

Referring to Fig. 2, drive shaft 60 drives converter pump 62 which transmits torque to turbine 63. Stator 64 is a reaction member and is mounted for rotation on stationary hub 65 of housing flange 66 and is held against backward rotation by free wheel unit 67. Turbine 63 is splined to input shaft 68 which is integral with ring gear 69 of gear set A2 and meshes with several planet gears 70, one of which is shown mounted on shaft 71 in planet carrier 72.

Clutch C2 consists of housing 73 which is integral with sun gears 82 and 83 and contains clutch discs 74 and 77 and piston 75 and has pressure plate 76 attached to it. Sliding disc 77 is splined to teeth 78 cut on the outside of ring gear 69. Oil pressure entering through tube 79 and passages 80 and 81 moves piston 75 to engage plates 74 and 77 against pressure plate 76 and thus connects the input shaft 68 to sun gears 82 and 83. Clutch housing 73 is supported in hub 84 of housing 85.

Planet carrier 72 is integral with intermediate shaft 86 and clutch flange 87 is splined to shaft 86. Sun gear 83 of gear set B2 meshes with planet gears 88 one of which is shown mounted on shaft 89 which is fixed on carrier 90. Ring gear 91 also acts as a pressure plate for clutch D2 which consists of housing 92, discs 93 and 94 and piston 95. Clutch housing 92 is integral with output shaft 96 and has teeth 97 cut in its periphery which can be engaged by parking brake detent 98 which is attached to housing 85.

Oil pressure through tube 99 and passage 100 moves piston 95 to engage clutch D2. Brake band E2 acts on clutch housing 73 which also acts as a brake drum, to hold it stationary. Brake band F2 acts on drum 104 which is integral with carrier 90 to hold it stationary.

Pump gears 104 and 105 are driven from the input shaft 60 through pump 62, the hub 106 of which is notched to fit onto mating notches in gear 105. Pump housing 107 encloses these gears.

Output shaft 96 is supported in housing flange 108 and drives pump gears 109 and 110 by means of a key not shown which locks gear 110 to output shaft 96. Pump housing 111 encloses these pump gears.

*Operation 2*

In Fig. 2 in neutral, clutches C2 and D2 and brake bands E2 and F2 are released. Intermediate shaft 86 floats between the input shaft 68 and the output shaft 96 and the frictional drag causes shaft 86 to turn at a speed slower than that of the input shaft when the vehicle is standing still. This prevents high tooth engagement speeds at any of the gears, and also prevents a high differential speed between friction members in both clutches.

In low speed clutch D2 and brake F2 are engaged which forces sun gears 82 and 83 to turn backward and carrier 72 and ring gear 91 forward at low speed. This is a differential drive with a split path of power partly through gear set A2 and partly through both sets A2 and B2 carrier 90 being the reaction member.

In second speed clutch D2 remains engaged but brake band F2 is released and brake band E2 is engaged and sun gear 82 becomes the reaction member with the entire speed reduction occurring in gear set A2 while gear set B2 idles slowly.

In high speed brake bands E2 and F2 are released and clutches C2 and D2 are both engaged. This locks up the gears so that a one to one ratio is obtained without an extra third clutch.

In reverse clutch C2 and brake band F2 are engaged.

Noise from gear set A2 is avoided by its being locked up to rotate as a unit with input shaft 68 by clutch C2.

Since the sun gears are integral, sun 83 also rotates as a unit with the input shaft 68. Carrier 90 is now the reaction member which results in ring 91 rotating backward at reduced speed. The relative speed of clutch discs 93 and 94 is equal to the sum of input and putout shaft speeds but this is considerably less than the speed of corresponding clutch members in either of my Patents 2,518,824 or 2,518,825, when designed for the same speed ratios.

In Figs. 3 and 4, H5 and H6 are converters, A5, B5; A6, B6; are planetary gear sets, C5, D5; C6, D6; are disc clutches and E5, F5; E6, F6; are brake bands respectively of Figs. 3 and 4. These transmissions operate in the same way as the ones shown respectively in Figs. 1 and 2 with respect to the functioning of the gears, brake bands, clutches and the brake bands and the clutches are connected to the same members as in Figs. 1 and 2. However, in each of Figs. 3 and 4, the position of the two gear sets with reference to the converter has been transposed so that in Figs. 3 and 4, gear sets B5 and B6, respectively, are adjacent to the converter instead of gear sets A1 and A2 in Figs. 1 and 2, respectively.

These optional gear locations are shown and described to illustrate that the present disclosure applies to both of these two possible positions of the gear sets when used in a variable speed transmission.

Following is a chart showing the various brake bands and clutches that are applied and engaged in the different speeds in Figs. 1, 2, 3 and 4.

|       | Fig. 1 | Fig. 2 | Fig. 3 | Fig. 4 |
|-------|--------|--------|--------|--------|
| Low   | F1, D1 | F2, D2 | F5, D5 | F6, D6 |
| 2nd   | E1, D1 | E2, D2 | E5, D5 | E6, D6 |
| High  | C1, D1 | C2, D2 | C5, D5 | C6, D6 |
| Rev   | F1, C1 | F2, C2 | F5, C5 | F6, C6 |

While specific embodiments of my invention have been described above in detail it will be understood that numerous modifications could be made without departing from the scope of the invention as set forth in the following claims.

I claim:

1. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a brake for holding the carrier of said other set and a clutch for connecting the carrier of said one set with the output shaft whereby when the brake is applied and the clutch is engaged a low speed ratio is obtained in the transmission.

2. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a brake for holding the sun gears of both sets and a clutch for connecting the carrier of said one set to the output shaft whereby when the brake is applied and the clutch is engaged an intermediate speed is obtained in the transmission.

3. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a brake for holding the carrier of said other set and a clutch for connecting the carrier of said one set to the sun gears of both sets whereby when the brake is applied and the clutch is engaged a reverse drive is obtained in the transmission.

4. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a first clutch for connecting the carrier of said one set to the output shaft, a second clutch for connecting the carrier of said one set to the sun gears of both sets whereby when both clutches are engaged a direct drive is obtained in the transmission.

5. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a brake for holding the carrier of said other set and a clutch for connecting the ring and sun gears of said one set whereby when the brake is applied and the clutch is engaged a reverse drive is obtained.

6. A variable speed transmission comprising a housing, input and output shafts, two planetary gear sets each set including ring and sun gears, planet gears meshing with the ring and sun gears and a carrier rotatably supporting the planet gears, the sun gears being connected together, the input shaft being connected to the ring gear of one set and the output shaft being connected to the ring gear of the other set, a first clutch for connecting the carrier of said one set to the output shaft, a second clutch for connecting the ring gear of said one set to the sun gears of both sets, whereby when both clutches are engaged a direct drive through the transmission is obtained.

7. A variable speed transmission comprising a housing, input and output shafts, two planetary gear sets each set including ring and sun gears, planet gears meshing with the ring and sun gears and a carrier rotatably supporting the planet gears, means for connecting the sun gears, means for connecting the input shaft with the ring gear of one set, means for connecting the ring gear of the other set with the output shaft, releasable means for connecting the carrier of said one set with the output shaft, releasable means for holding the carrier of said other set against rotation, releasable means for holding said sun gears against rotation, and releasable means for locking the elements of said one set for conjoint rotation.

8. The combination of claim 7 wherein said last means comprises clutch means between two of the three named ring, sun and carrier elements of said one set.

9. The combination of claim 7 wherein said last means comprises clutch means between the sun and one of the two named ring and carrier elements of said one set.

10. The combination of claim 9 wherein said clutch means is between the sun and ring gears of said one set.

11. The combination of claim 9 wherein said clutch means is between the sun gear and carrier of said one set.

12. A variable speed transmission comprising a housing, input and output shafts, two planetary gear sets each set including ring and sun gears, planet gears meshing with the ring and sun gears and a carrier rotatably supporting the planet gears, means for connecting the sun gears, means for connecting the input shaft with the ring gear of one set, means for connecting the ring gear of the other set with the output shaft, means for connecting the carrier of said one set with the output shaft, releasable means for holding the carrier of said other set against rotation, releasable means for holding said sun gears against rotation, and a single clutch for locking the elements of said one set for conjoint rotation.

References Cited in the file of this patent

UNITED STATES PATENTS

| | | |
|---|---|---|
| 2,518,824 | Simpson | Aug. 15, 1950 |
| 2,518,825 | Simpson | Aug. 15, 1950 |
| 2,749,773 | Simpson | June 12, 1956 |

FOREIGN PATENTS

| | | |
|---|---|---|
| 387,623 | France | July 18, 1908 |
| 1,069,080 | France | July 5, 1954 |